United States Patent
Younsi et al.

(10) Patent No.: US 7,508,119 B2
(45) Date of Patent: Mar. 24, 2009

(54) MULTIFUNCTION SENSOR SYSTEM FOR ELECTRICAL MACHINES

(75) Inventors: Karim Abdelkrim Younsi, Ballston Lake, NY (US); Charles Erklin Seeley, Niskayuna, NY (US); Sameh Ramadan Salem, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 238 days.

(21) Appl. No.: 11/425,792

(22) Filed: Jun. 22, 2006

(65) Prior Publication Data

US 2007/0296309 A1 Dec. 27, 2007

(51) Int. Cl.
*H01L 41/04* (2006.01)
*H01L 41/047* (2006.01)

(52) U.S. Cl. .................................... 310/338; 310/365
(58) Field of Classification Search ................. 310/338, 310/340, 344, 346, 365, 366
See application file for complete search history.

(56) References Cited

U.S. PATENT DOCUMENTS

| | | | |
|---|---|---|---|
| 4,849,668 A | 7/1989 | Crawley et al. | |
| 4,949,001 A | 8/1990 | Campbell | |
| 5,869,189 A | 2/1999 | Hagood, IV et al. | |
| 6,048,622 A | 4/2000 | Hagood, IV et al. | |
| 6,420,819 B1* | 7/2002 | Lazarus et al. | 310/330 |
| 6,629,341 B2 | 10/2003 | Wilkie et al. | |
| 7,030,366 B2 | 4/2006 | Seeley et al. | |
| 2002/0047496 A1* | 4/2002 | Wierach | 310/321 |
| 2005/0218560 A1 | 10/2005 | Booth | |
| 2005/0218906 A1 | 10/2005 | Younsi et al. | |
| 2005/0218907 A1 | 10/2005 | Lee et al. | |

FOREIGN PATENT DOCUMENTS

| | | | |
|---|---|---|---|
| DE | 3816047 | * | 2/1989 |
| JP | 05-060826 | * | 3/1993 |
| JP | 2002-022560 | * | 1/2002 |

OTHER PUBLICATIONS

Machine translation of JP 05-060826.*
Machine translation of JP 2002-022560.*
Machine translation of DE 3816047.*

* cited by examiner

*Primary Examiner*—Quyen P Leung
*Assistant Examiner*—Derek J Rosenau
(74) *Attorney, Agent, or Firm*—Ann M. Agosti (57) ABSTRACT

A multifunction sensor system for an electrical machine includes a piezoelectric vibration sensor a resistive temperature and partial discharge sensor which may optionally be integral with the piezoelectric vibration sensor; and packaging enclosing the vibration, the resistive temperature, and the partial discharge sensors.

13 Claims, 7 Drawing Sheets

MULTIFUNCTION SENSOR SYSTEM FOR ELECTRICAL MACHINES

BACKGROUND

The invention relates generally to condition assessment and more particularly to condition assessment of electrical machines.

Many different types of electrical machines use electrical conductors that are insulated. For example, motors and generators commonly include wound rotors and stators or may include preformed windings or coils. The conductors typically serve either to conduct electrical current or to produce magnetic fields by virtue of the flow of such current. Insulation systems separate conductors and windings from one another and from adjacent components in the assembled system. Such insulation systems may include various varnish systems, tapes, coatings, and sleeves. The integrity of the insulation systems is important to the reliability and life expectancy of the electrical equipment in which they are installed.

Off line methods for evaluating the insulation condition include over-voltage, high potential, or high voltage ramp tests, insulation resistance or polarization index tests, surge tests, dissipation factor tests, also known as "tan delta" or power factor tests, and off-line partial discharge tests. Conventional off-line techniques can be intrusive and costly because the electrical machines must be shut down and taken out of service to perform the required diagnostic test.

Several on-line measurement techniques are also available for monitoring the winding insulation condition. Techniques such as vibration measurement and temperature measurement detect severe fault conditions only after the fault has occurred and result in proactive maintenance and servicing being difficult. Partial discharge analysis techniques detect early symptoms of insulation degradation but require expensive specialized equipment. Typically on-line measurement techniques are combined such that a different sensing instruments and packages are used for assessing different parameters. In particular, resistive temperature sensors typically comprise conductors around an insulated base which are wound and then molded. The resulting package is bulky and not easily integrated with other sensor packaging.

BRIEF DESCRIPTION

It would be desirable to provide a multifunction sensor system for assessing the condition of electrical machines.

Briefly, in accordance with one embodiment, a multifunction sensor system for an electrical machine comprises: a piezoelectric vibration sensor; a resistive temperature and partial discharge sensor; and packaging enclosing the vibration, resistive temperature, and partial discharge sensors.

In accordance with another embodiment, a multifunction sensor system for an electrical machine comprises: an integral piezoelectric vibration, partial discharge, and resistive temperature sensor comprising a piezoelectric substrate comprising two opposing surfaces, a first side electrode overlying a first opposing surface, and a second side electrode overlying a second opposing surface; cables selectively coupled to the first and second side electrodes; and packaging enclosing the sensor.

In accordance with another embodiment, an electric generator comprises: a stator comprising stator slots and stator bars situated within the stator slots; and a sensor system situated within a stator slot, the sensor system comprising a piezoelectric vibration sensor, a resistive temperature and partial discharge sensor, and packaging enclosing the vibration, resistive temperature, and partial discharge sensors.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
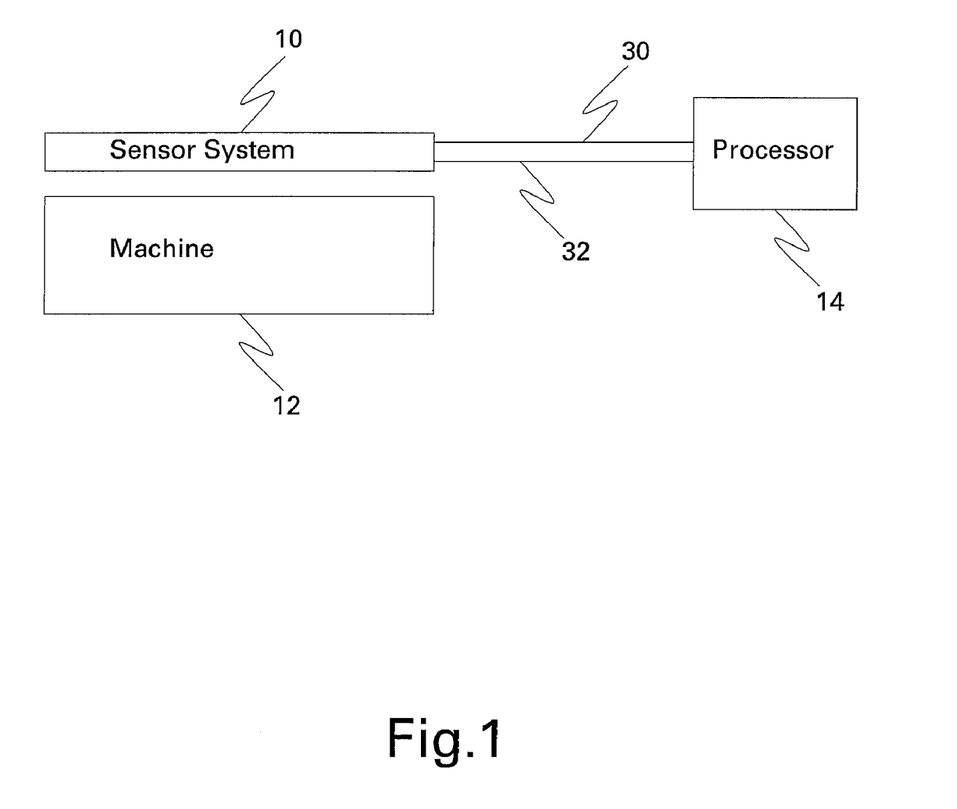
FIG. 1 is a block diagram of a multifunction sensor system in accordance with one embodiment of the present invention.

FIG. 1 is a block diagram of a multifunction sensor system 10 in accordance with one embodiment of the present invention. Sensor system 10 is positioned relative to electrical machine 12 and transmits signals to processor 14, typically by cables 30 and 32. Sensor system 10 may be positioned either by insertion or mounting into a designated location of machine 12 for sensing during machine operation.

Sensor system 10 is configured for sensing vibration, temperature, and partial discharge with respect to the machine. In one embodiment, sensor system 10 has a thickness of less than or equal to ten millimeters. In an additional or alternative embodiment, an integral sensor is used for sensing vibration, temperature, and partial discharge.

Figure 2:
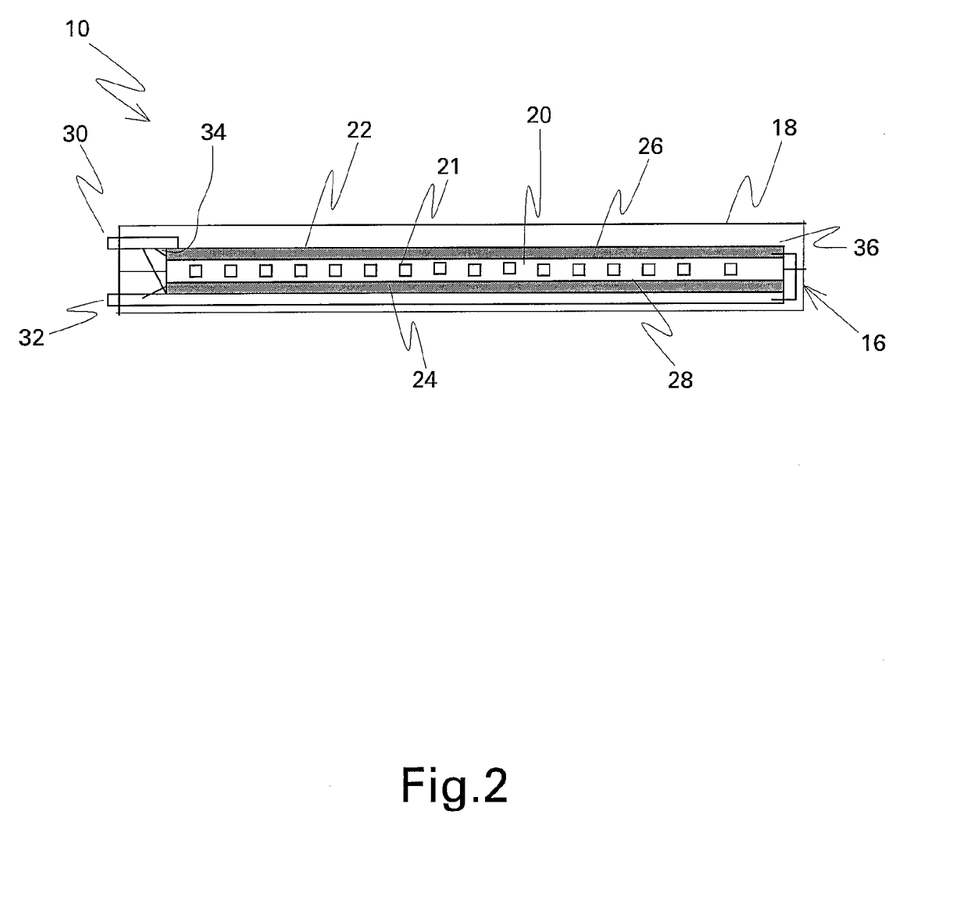
FIG. 2 is a side view and FIG. 3 is a perspective view of a multifunction sensor system in accordance with another embodiment of the present invention.
Figure 3:
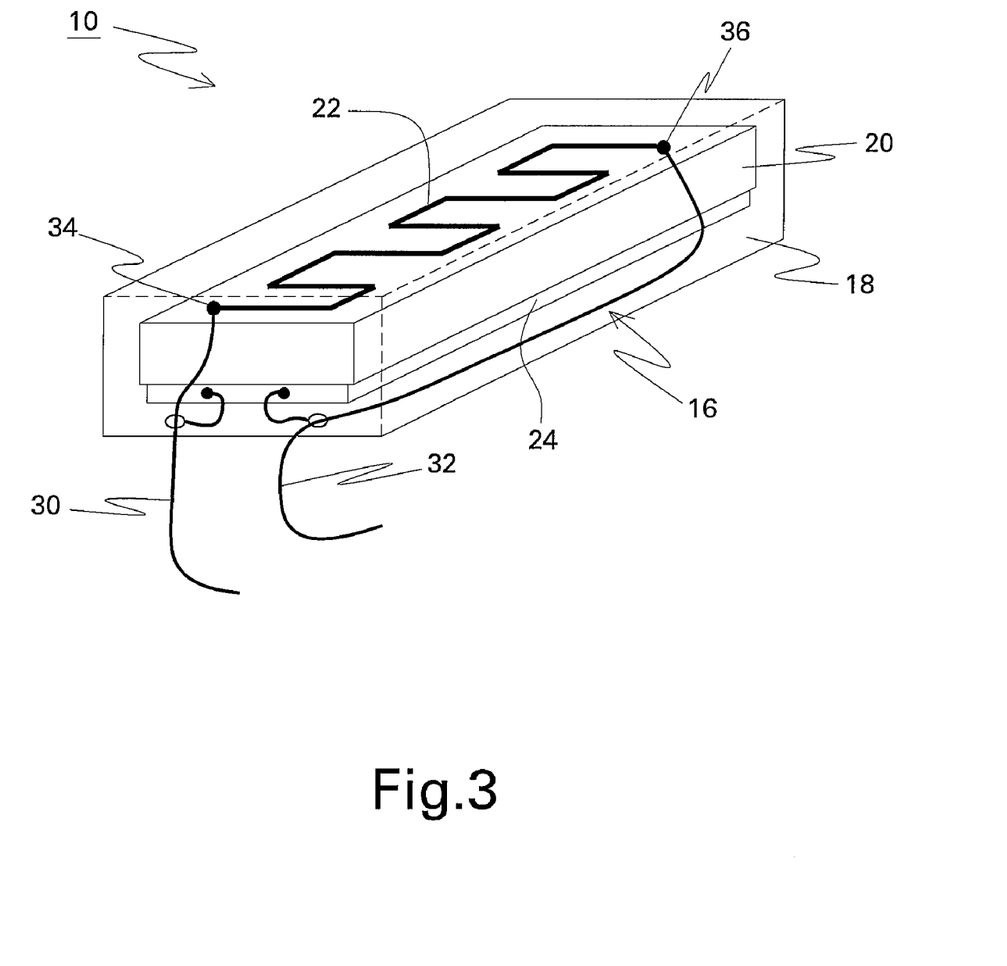

FIG. 2 is a side view and FIG. 3 is a perspective view of a multifunction sensor system in accordance with a more specific embodiment of the present invention wherein sensor system 10 comprises a piezoelectric vibration sensor 16; a resistive temperature and partial discharge sensor 16; and packaging 18 enclosing the vibration, resistive temperature, and partial discharge sensors.

Packaging 18 may comprise any structurally suitable electrically insulating material with one example including a composite of glass and epoxy or polyester. Packaging 18 has a height which varies according to the space in which the sensor system will be inserted and typically has a thickness of less than or equal to ten millimeters. For some applications, packaging 18 has a thickness of less than or equal to five millimeters. In one example, the length of the packaging will be at least 30 centimeters and the width will range from one centimeter to 10 centimeters.

In the embodiments of FIGS. 2 and 3, the piezoelectric vibration sensor is integral with the resistive temperature and partial discharge sensor and comprises an integrated sensor 16. More specifically, the integrated sensor comprises a piezoelectric substrate 20 comprising two opposing surfaces 26 and 28, a first side electrode 22 overlying a first opposing surface 26, and a second side electrode 24 overlying a second opposing surface 28.

Figure 9:
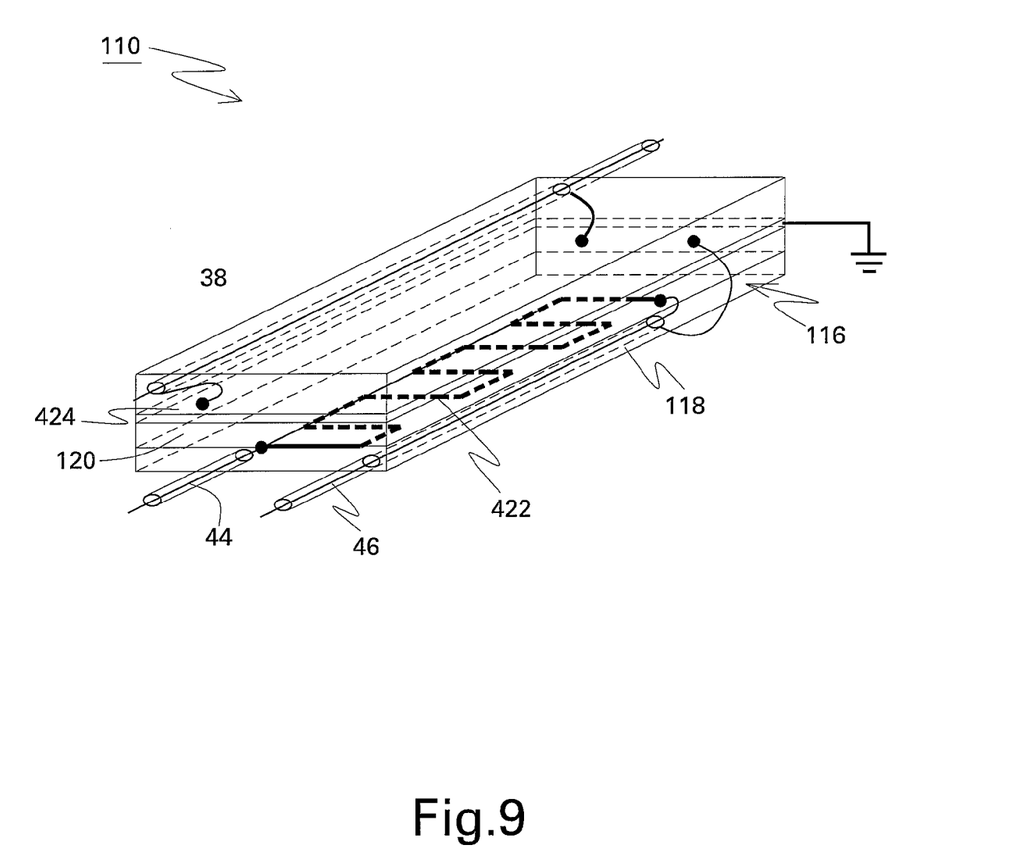
FIG. 9 is a perspective view of a multifunction sensor system in accordance with another embodiment of the present invention.

Piezoelectric substrate 20 may comprise any suitable piezoelectric material and, in one embodiment, comprises piezoelectric fibers 21 embedded in dielectric material. In one more specific embodiment, piezoelectric fibers 21 comprise ceramic fibers or single crystal fibers, or combinations thereof, and the dielectric film material of substrate 20 comprises a polymer such as a polyimide. In an alternative embodiment, such as shown in FIG. 9, piezoelectric substrate 120 comprises a monolithic substrate. In either embodiment, any appropriate piezoelectric material may be used with several examples including polyvinylidene fluoride and lead zirconate titanate. In one example, the thickness of the piezoelectric substrate ranges from 100 micrometers to 500 micrometers. In a more specific example, the thickness of the piezoelectric substrate ranges from 200 micrometers to 300 micrometers.

Electrodes 22 and 24 comprise any suitable electrically conductive material and in one embodiment comprises copper. In one example, the thickness of an electrode ranges from 5 micrometers to 200 micrometers. In a more specific example, the thickness of an electrode ranges from 10 micrometers to 15 micrometers. Electrode 22 (as well as electrode 24 if desired) may either be unpatterned (a sheet) or be patterned in any one of a number of variations with several non-limiting examples being discussed in more detail below with respect to FIGS. 4-8.

Sensor system 10 may further comprise coaxial cables. In the embodiment of FIG. 2, a first coaxial cable 30 is coupled to second side electrode 24 and a first end 34 of first side electrode 22, and a second coaxial cable 32 is coupled to second side electrode 24 and a second end 36 of first side electrode 22. When coaxial cables are used, such cables typically have a central conductor separated from an outer conductor by insulation. Although two coaxial cables are illustrated for purposes of example, coaxial cables are not required. In another example (not shown), three or four discrete cables may alternatively be used.

Readings for the various parameters may be obtained either simultaneously or in parallel through either multiplexing or filtering. For temperature sensing, relevant signal lines are those coupled to first end 34 and second end 36 of first side electrode 22. Current (on the order milliamps) may be injected through the cable before measuring the resulting DC voltage (which is a function of temperature). For vibration sensing, relevant signal lines are those coupled to first side electrode 22 and second side electrode 24. Strain in the piezoelectric material generates a charge in the electrode in proportion to the vibration and can be seen in the spectrum of 10 Hz to 10 MHz, but normally is present in the range of 100 Hz to 10 kHz. Vibration may be low frequency or high frequency and depends upon whether the vibration is a routine type of vibration (lower frequency) or an impact or shock type of vibration (higher frequency). For partial discharge analysis, relevant signal lines are those coupled to first end 34 and second end 36 of first side electrode 22. The spectrum of interest for partial discharge is typically in the MHz to tens of MHz range.

Figure 4:
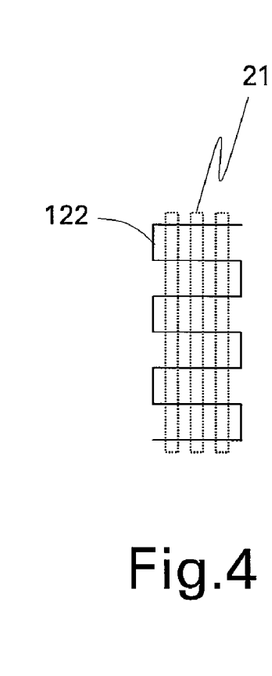
FIGS. 4-8 are schematic diagrams of various electrode configurations.
Figure 5:
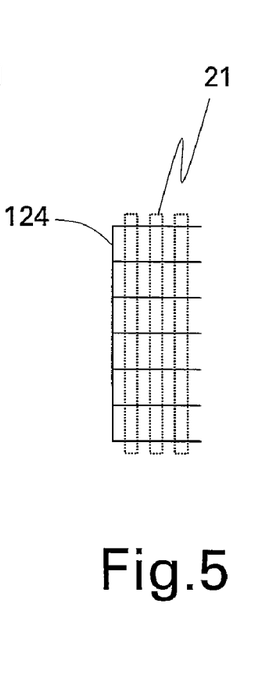

FIGS. 4-8 are schematic diagrams of various electrode configurations. It is envisioned but not required that at least one of the electrodes (shown as first side electrode 22 for purposes of example) will be patterned. The other electrode, which is used for a ground plane, also may either be patterned or unpatterned. FIG. 5 illustrates a potential pattern for a second side electrode 124 which may complement the embodiment of FIG. 4 by having the conductors of the first and second side electrodes be situated parallel.

Figure 6:
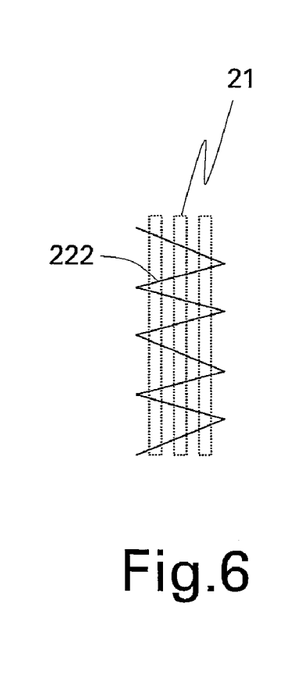
Figure 7:
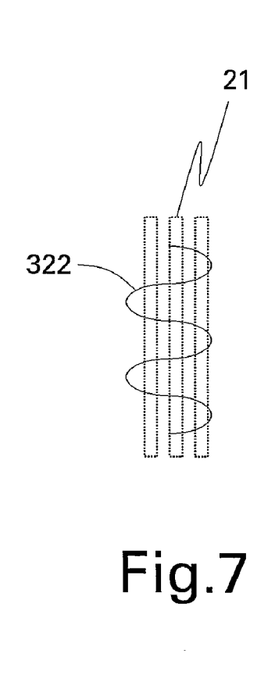

In a more specific embodiment, the first side electrode comprises a serpentine shape. As used herein "serpentine shape" is intended to mean a shape which oscillates across piezoelectric fibers 21. For example a square wave electrode 122 is illustrated in FIG. 4, a triangular wave electrode 222 is illustrated in FIG. 6, and a sine wave electrode 322 is illustrated in FIG. 7. When piezoelectric fibers are used, even if a serpentine shape is not chosen, at least some portion of the electrode will need to cross them if current through the electrode is to be used to create the strain to be measured.

Figure 8:
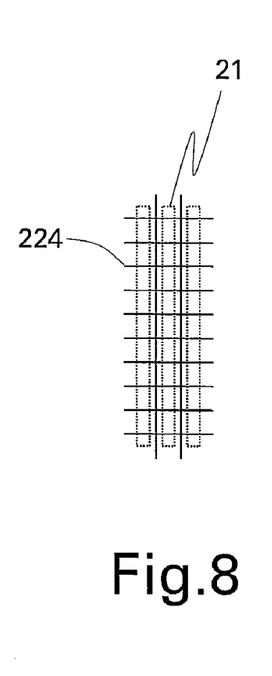

The above examples are for purposes of illustration. As stated above, no patterning is required. Additionally, other selected patterns may alternatively be used. Another example electrode shape is shown in FIG. 8 and comprises a crosshatched electrode shape 224.

FIG. 9 is a perspective view of a multifunction sensor system 110 in accordance with an embodiment of the present invention wherein sensor 116 comprises a piezoelectric substrate 120 comprising two opposing surfaces, a first electrode 422 facing a first opposing surface, and a second electrode 424 facing a second opposing surface. The example of FIG. 9 further illustrates coaxial cables 38, 44, and 46 coupled to the first and second electrodes, and a molding compound serving as packaging 118 for securing the piezoelectric substrate, the first and second electrodes, and the coaxial cables. In one embodiment, the molding compound comprises an epoxy.

Figure 10:
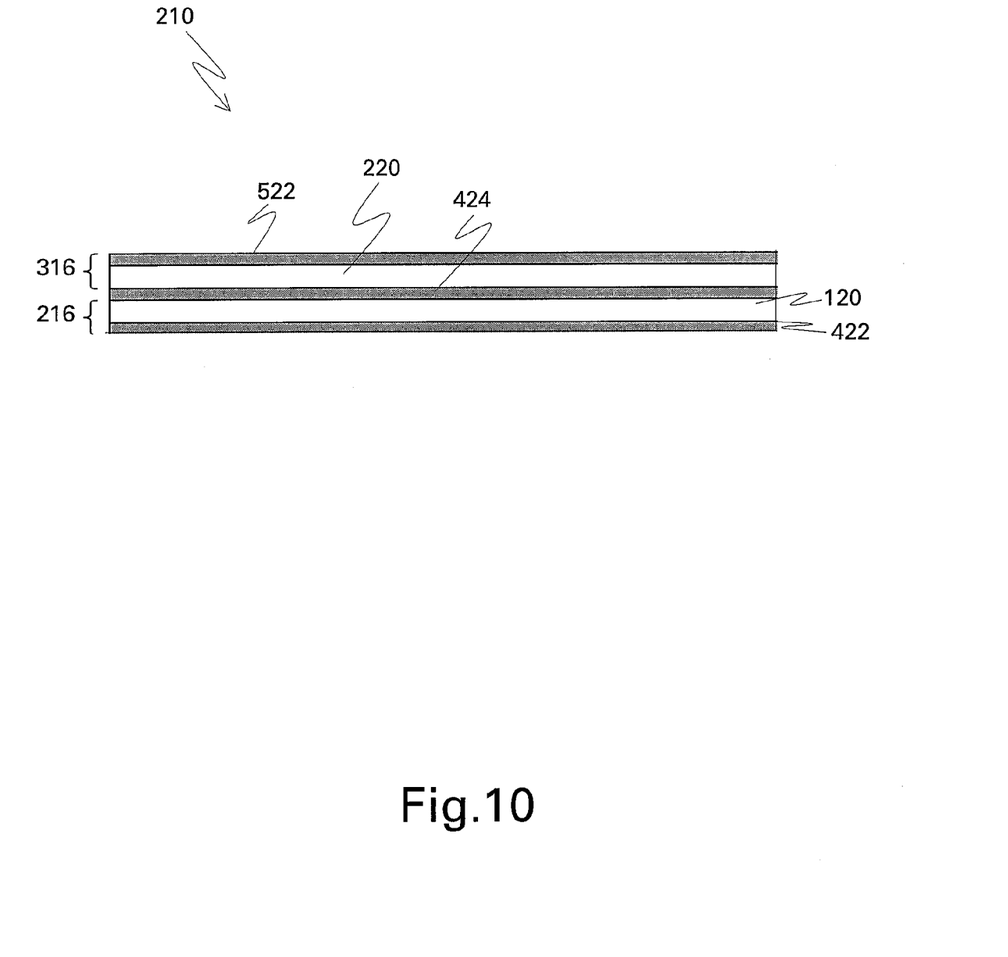
FIG. 10 is a side view of a multifunction sensor system in accordance with another embodiment of the present invention.

FIG. 10 is a perspective view of a multifunction sensor system 210 in accordance with an embodiment of the present invention including piezoelectric substrate 120, first electrode 422, and second electrode 424, and wherein the first and second electrodes 422 and 424 are situated adjacent piezoelectric substrate 120. The embodiment of FIG. 10 further comprises a second substrate 420 and a third electrode 522 situated on second substrate 220. In a more specific embodiment, second electrode 424 comprises a ground plane situated between piezoelectric substrate 120 and second substrate 220, piezoelectric vibration sensor 216 comprises piezoelectric substrate 120 and the first and second electrodes 422 and 424, and resistive temperature and partial discharge sensor 316 comprises second substrate 220 and the second and third electrodes 424 and 522. The ground plane may be applied on the second substrate or the piezoelectric substrate. Packaging (not shown) is then applied around the sensors and may comprise any suitable materials including those discussed with respect to packaging 18 of FIGS. 2-3 and packaging 118 of FIG. 9.

Figure 11:
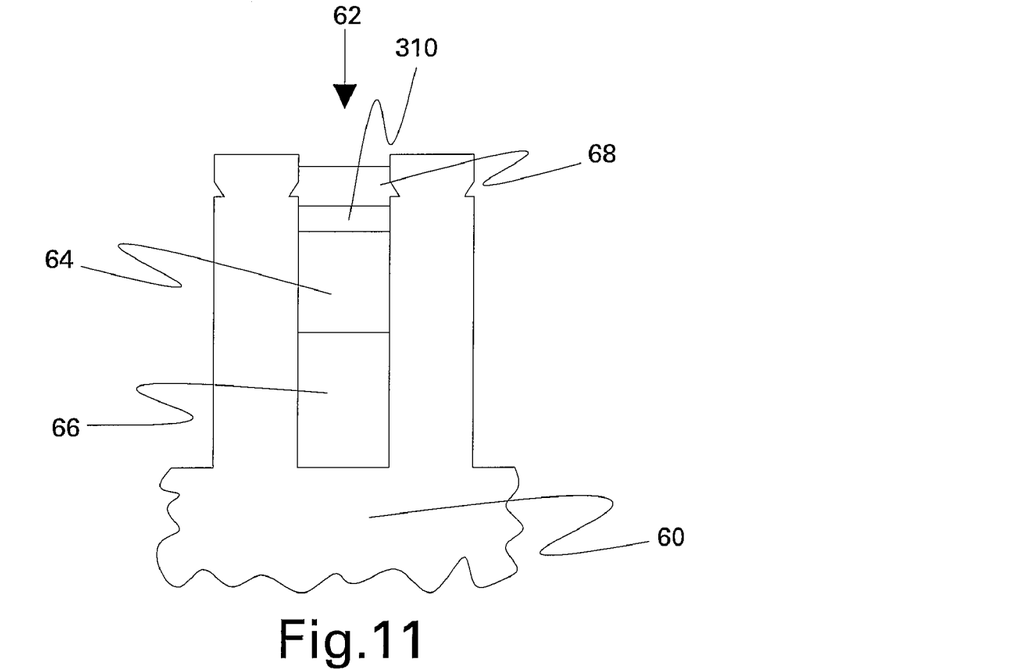
FIGS. 11 and 12 are sectional side views of electrical generator stators in accordance with other embodiments of the present invention.
Figure 12:
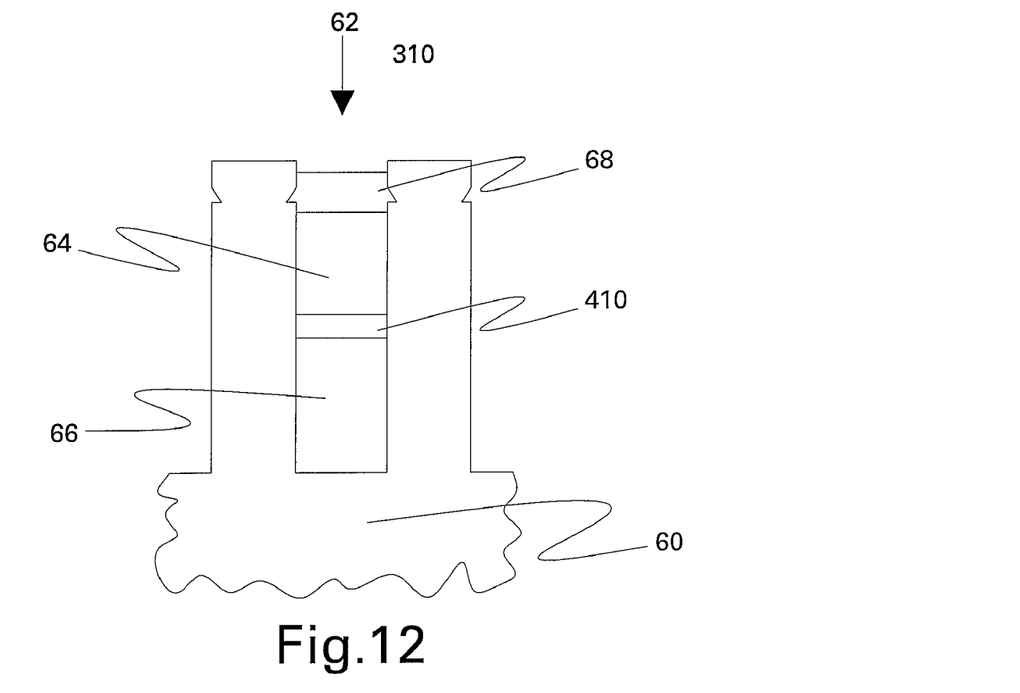

FIGS. 11 and 12 are sectional side views of electrical generator stators in accordance with other embodiments of the present invention. In these embodiments, an electric generator 112 or 212 comprises a stator 60 comprising stator slots 62 and stator bars 64 and 66 situated within the stator slots, and a sensor system 310 or 410 situated within a stator slot. Two stator bars are illustrated in a single slot for purposes of example, but this configuration is not required. The sensor system comprises a piezoelectric vibration sensor, a resistive temperature and partial discharge sensor, and packaging enclosing the vibration, resistive temperature, and partial discharge sensors (shown in FIGS. 2, 9, and 10 for example).

In the more specific example of FIG. 11, the stator further comprises stator wedges 68 situated within the stator slots, and sensor system 310 is situated in the stator slot between a stator wedge and a stator bar. In the more specific example of FIG. 12, sensor system 410 is situated between adjacent stator bars in the stator slot.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A multifunction sensor system for an electrical machine comprising:
   a piezoelectric vibration sensor;
   a resistive temperature and partial discharge sensor, wherein the piezoelectric vibration sensor and the resistive temperature and partial discharge sensor comprise a piezoelectric substrate comprising two opposing surfaces, a first side electrode overlying a first opposing surface, and a second side electrode overlying a second opposing surface;
   packaging enclosing the vibration, resistive temperature, and partial discharge sensors, and
   two coaxial cables comprising a first coaxial cable coupled to the second side electrode and a first end of the first side electrode and a second coaxial cable coupled to the second side electrode and a second end of the first side electrode.

2. The sensor system of claim 1 wherein the packaging has a thickness of less than or equal to ten millimeters.

3. The sensor system of claim 1 wherein the piezoelectric vibration sensor is integral with the resistive temperature and partial discharge sensor and comprises an integrated sensor.

4. The sensor system of claim 1 wherein the first side electrode comprises a serpentine shape.

5. The sensor system of claim 3 wherein the integrated sensor comprises a piezoelectric substrate comprising two opposing surfaces, a first electrode facing a first opposing surface, and a second electrode facing a second opposing surface.

6. The sensor system of claim 5 wherein the piezoelectric substrate comprises polyvinylidene fluoride or lead zirconate titanate.

7. The sensor system of claim 5 further comprising a molding compound for securing the piezoelectric substrate, the first and second electrodes, and the coaxial cables.

8. The sensor system of claim 5 further comprising a second substrate and a third electrode situated on the second substrate.

9. A multifunction sensor system for an electrical machine comprising:
   a piezoelectric substrate comprising two opposing surfaces;
   a first electrode facing a first opposing surface;
   a second electrode facing a second opposing surface;
   a second substrate;
   a third electrode situated on the second substrate,
   wherein the second electrode comprises a ground plane situated between the piezoelectric substrate and the second substrate,
   wherein the piezoelectric substrate and the first and second electrodes comprise a piezoelectric vibration sensor, and
   wherein the second substrate and the second and third electrodes comprise a resistive temperature and partial discharge sensor.

10. A multifunction sensor system for an electrical machine comprising:
    an integral piezoelectric vibration, partial discharge, and resistive temperature sensor comprising a piezoelectric substrate comprising two opposing surfaces, a first side electrode overlying a first opposing surface, and a second side electrode overlying a second opposing surface, wherein the first side electrode comprises a serpentine shape;
    cables selectively coupled to the first and second side electrodes; and
    packaging enclosing the sensor.

11. The sensor system of claim 10 further comprising two coaxial cables comprising a first coaxial cable coupled to the second side electrode and a first end of the first side electrode and a second coaxial cable coupled to the second side electrode and a second end of the first side electrode.

12. The sensor system of claim 10 wherein the serpentine shape comprises a square wave, a triangular wave, or a curved wave.

13. The sensor system of claim 10 wherein the piezoelectric substrate is selected from the group of monolithic piezoelectric substrates and embedded-fiber piezoelectric substrates.

* * * * *